（12) United States Patent
Nguyen et al.

(10) Patent No.: US 10,936,449 B2
(45) Date of Patent: Mar. 2, 2021

(54) COMPONENT REDUNDANCY SYSTEMS, DEVICES, AND METHODS

(71) Applicant: Intel Corporation, Santa Clara, CA (US)

(72) Inventors: Hang T. Nguyen, Tempe, AZ (US); Stephen T. Palermo, Chandler, AZ (US); John J. Browne, Limerick (IE); Chris MacNamara, Limerick (IE); Pradeepsunder Ganesh, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 832 days.

(21) Appl. No.: 15/465,247

(22) Filed: Mar. 21, 2017

(65) Prior Publication Data
US 2018/0275893 A1   Sep. 27, 2018

(51) Int. Cl.
*G06F 11/00* (2006.01)
*G06F 11/20* (2006.01)
*G06F 3/06* (2006.01)
*G06F 11/30* (2006.01)

(52) U.S. Cl.
CPC .......... *G06F 11/203* (2013.01); *G06F 3/0616* (2013.01); *G06F 3/0647* (2013.01); *G06F 11/008* (2013.01); *G06F 11/20* (2013.01); *G06F 11/2041* (2013.01); *G06F 11/2043* (2013.01); *G06F 11/2046* (2013.01); *G06F 11/3024* (2013.01); *G06F 11/3058* (2013.01)

(58) Field of Classification Search
CPC .............. G06F 11/008; G06F 11/0721; G06F 11/0724; G06F 11/0751; G06F 11/0754; G06F 11/165181; G06F 11/20; G06F 11/2023; G06F 11/2028; G06F 11/203; G06F 11/2038; G06F 11/2041; G06F 11/2043; G06F 11/2046; G06F 11/2069; G06F 11/2097; G06F 11/3006; G06F 11/3024; G06F 11/3051; G06F 11/3055; G06F 11/3058; G06F 11/3433; G06F 3/0616; G06F 3/0653; G06F 3/0673; G06F 3/0635; G06F 3/0647
See application file for complete search history.

(56) References Cited

U.S. PATENT DOCUMENTS

2017/0286176 A1\* 10/2017 Artman ................. G06F 9/5027
2018/0095802 A1    4/2018 Nguyen et al.

\* cited by examiner

*Primary Examiner* — Joseph D Manoskey
(74) *Attorney, Agent, or Firm* — Schwegman Lundberg & Woessner, P.A.

(57) ABSTRACT

Discussed herein are component redundancy systems, devices, and methods. A method to transfer a workload from a first component to a second component of a same device may include monitoring a wear indicator associated with the first component, and in response to an indication that the first component is stressed based on the wear indicator, transferring a workload of the first component to the second component.

35 Claims, 5 Drawing Sheets

COMPONENT REDUNDANCY SYSTEMS, DEVICES, AND METHODS

TECHNICAL FIELD

Embodiments discussed herein regard computing devices. One or more embodiments may offload a task from a first compute element of a computing device to another compute element of the same computing device.

BACKGROUND

Materials wear out and become incapable of being used for their intended purpose. Some materials wear out faster than others. Some environmental factors may reduce an amount of wear on a material, thus prolonging a useful life of the material. Some environmental factors may increase an amount of wear on the material, thus reducing a useful life of the material. Silicon, ceramic, and other electric and electronic components are subject to such wear.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DESCRIPTION OF EMBODIMENTS

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Component failure, whether it is a processor core error, gate or logic failure of an FPGA, or other component failure or error may be difficult to predict. Discussed herein are embodiments that may help improve the reliability of computing devices. One or more embodiments may help improve uptime or availability of such computing devices, such as by migrating one or more operations performed by a component of the computing device to another component of the same or different computing device, such as when a fault (e.g., an error or failure) detected or predicted.

One or more embodiments may improve on network function virtualization (NFV) base platform reliability, such as by helping achieve the so-called "five nines" (99.999%) (e.g., with respect to reliability, availability, or other service level agreement (SLA) satisfaction), and by improving reliability of processes (e.g., virtual network functions (VNFs)) that operate on the NW base platform. One or more embodiments may predict when a component failure will likely occur and move at least a portion of the workload of the component predicted to fail to another component, such as a spare component. The spare component may be on the same socket or system as the component predicted to fail, so as to help avoid downtime by reducing or eliminating time needed to switch to a different socket or system. Service providers and/or mission critical enterprise services may benefit from using the failure predictions, so as to provide and fulfill better SLAs.

One or more embodiments regard excluding resources predicted to be faulty or actually faulty from being used based on one or more wear indicators. In some embodiments, even if a component has one or more elements that are predicted to fail (or have failed), the component may still be usable in other words, the same component may be used even if some part of the component is deemed faulty based on the one or more of the wear indicators. Some of the FIGs. present embodiments in an WV orchestrator environment (see FIG. 4), but may additionally or alternatively, be applied to another control environment that is responsible for allocating components (e.g., a datacenter 102 (see FIG. 1), FPGA controller, purpose-built accelerators (e.g., Quick Assist technology (QAT)), a non-virtualized multiple core processor, or the like).

Consider a telecommunications service provider. It may cost thousands of dollars for each maintenance event. Some of the maintenance may be related to a service outage caused by a hardware failure. One or more embodiments discussed herein may help prevent the service outage, retain uptime, and/or prevent a need for the maintenance, thus saving money.

Figure 1:
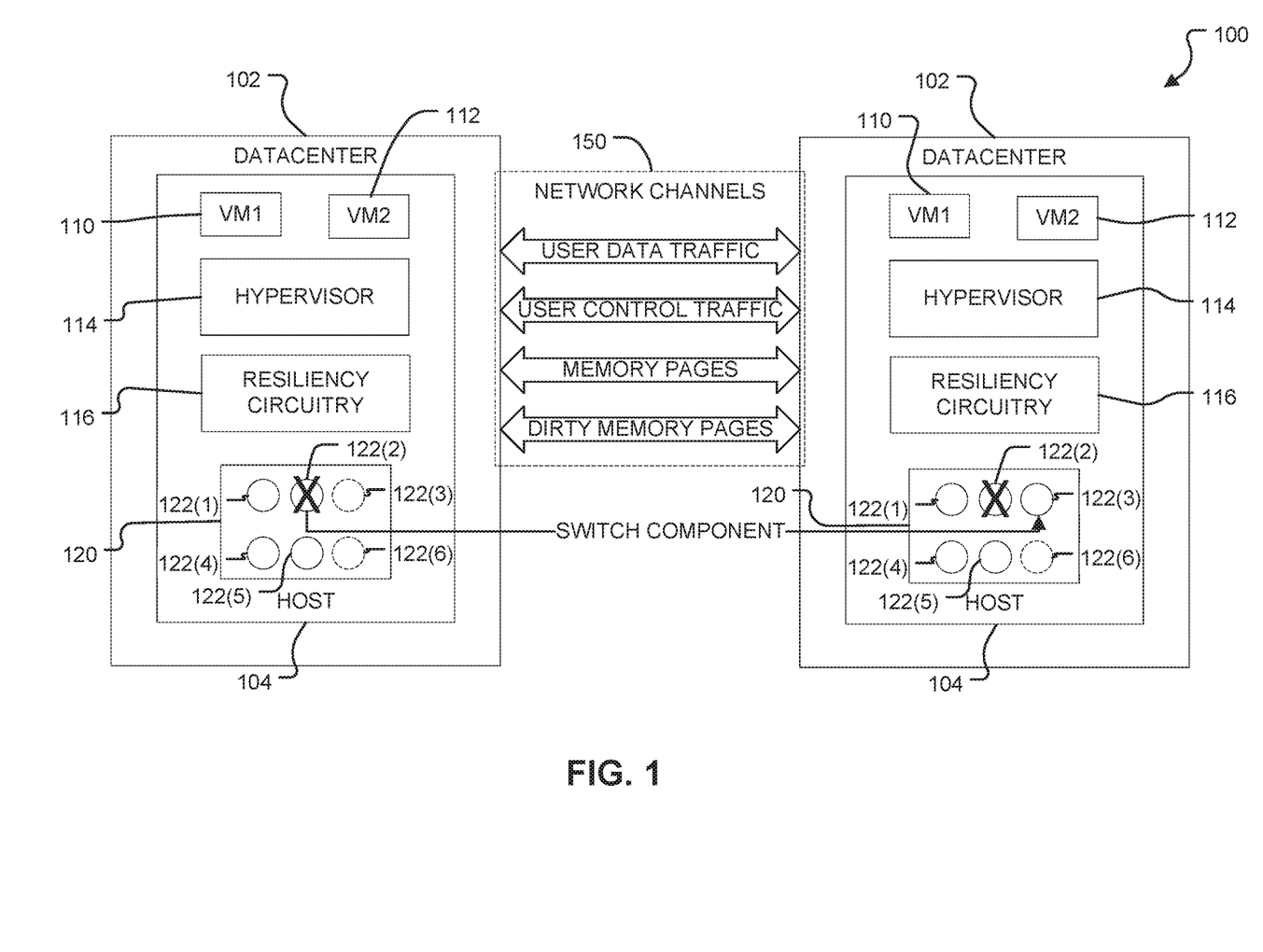
FIG. 1 illustrates, by way of example, a logical diagram of an embodiment of a component migration system.

FIG. 1 illustrates, by way of example, a logical diagram of an embodiment of a component migration system 100. The system 100 as illustrated includes a datacenter 102 before a component 122(2) is replaced with a spare component 122(3), and the datacenter 102 after operations of the component 122(2) is offloaded to the component 122(3). In offloading operations of the component 122(2) to the component 122(3), network channels 150 may be redirected to the component 122(3). The component 122(3) may be configured to be in a same processing state as the component 122(2) was at or near a time the component 122(2) is no longer used.

The datacenter 102 as illustrated includes a host 104. The host 104 may be one of a plurality of hosts in the datacenter 102 The host 104 as illustrated includes virtual machines 110 and 112, a hypervisor 114, resiliency circuitry 116, and electrical and/or electronic components 120. The components 120 include a plurality of components 122(1), 122(2), 122(3), 122(4), 122(5) and 122(6). While six components 122(1)-122(6) are illustrated, the components 120 may include generally any number (e.g., two or more) of components. The components 120 may include a processor, FPGA, purpose built accelerator, or the like (represented by component 120) with a plurality of processor cores, gate arrays, a processor of a purpose built accelerator, respectively, or the like (represented by the components 122(1)-122(6)). Cores are independent processing units that read instructions and perform operations. A gate array (e.g., an FPGA or a portion thereof) is a regular arrangement of logic gates that may be configured to perform a compute operation and/or instantiate a soft core, such as an Advanced Reduced Instruction Set Computing (RISC) Machine (ARM) software core.

The components 122(3) and 122(6) depicted in dashed lines are components that are not currently used or have some bandwidth available to perform other operations and components 122(1)-122(2) and 122(4)-122(5) are currently used. In an application specific integrated circuit (ASIC) a function performed by the ASIC may include redundant circuitry, such as may be used in place of the components and the spare components, respectively.

The resiliency circuitry 116 monitors components wear indicators. The resiliency circuitry 116 may include electric or electronic components, such as may include one or more transistors, resistors, capacitors, inductors, diodes, regulators (e.g., current, voltage, and/or power regulators), multiplexers, logic gates, switches, buffers, amplifiers, oscillators, modulators, demodulators, interconnects (e.g., wired or wireless signal transfer mechanisms), antennas, radios (receive and/or transmit radios), or the like. The resiliency circuitry 116 may include an application specific integrated circuit (ASIC), a programmable gate array (e.g., a programmable chip, such as may include an FPGA), central processing unit (CPU), graphics processing unit (GPU), or the like. The resiliency circuitry 116 may be configured as a state machine configured to receive data used in determining an amount of wear on a component 122(1)-122(2) and 122(4)-122(5) and determine, based on the received data, whether a workload of the component 122(1)-122(2) and 122(4)-122(5) is to be offloaded to another component 122(3) and 122(6) and/or whether the components 122(1)-122(2) and 122(4)-122(5) is to be reconfigured based on the wear indicator, such as to reduce a chance that the components will experience a fault.

Wear indicators may indicate (be used for indicating), for example, component utilization, state of the component, temperature, overclocking, transistor aging, voltage, time used, power utilization, component liveliness (e.g., heart indicator), memory bandwidth usage, cache usage, or the like. A value for the time used may be measured by various methods including counting a number of clock cycles per time period (e.g., per second, minute, hour, day, week, month, etc.) that the component was operational. Additionally or alternatively, a value for the time used may be measured by counting a number of time periods over a threshold number of clock cycles. If the number of counted time periods is greater than a time used threshold, the component may be determined, such as by the resiliency circuitry 116, to be stressed. The resiliency circuitry 116 may monitor a voltage value on one or more inputs and/or one or more outputs of the components 122(1)-122(2) and 122(4)-122(5). The voltage value may be monitored for fluctuations in the voltage, such as to determine whether the voltage value goes above and/or below a specified voltage value or range of voltage values (e.g., as determined by a manufacturer's specification or other specification of operating ranges). A voltage spike may physically damage the component 122(1)-122(2) and/or 122(4)-122(5), while a reduced voltage may indicate that a resistance of the component 122(1)-122(2) and/or 122(4)-122(5) has increased, thus indicating an operation change in the component 122(1)-122(2) and/or 122(4)-122(5).

Component utilization may be measured in instructions executed per time period or number of transitions on outputs indicating activity (in the case of a gate array). The component utilization may be compared to a utilization threshold to determine whether the component is stressed above an expected or specified level. The state of the component, whether it is executing instructions and performing operations, and which instructions and operations it is performing (if it is performing operations) may indicate stress on the component 122(1)-122(2) and 122(4)-122(5). For example, if a component is to execute a first operation as directed by an instruction and instead performs a second, different operation, the decoding circuitry of the component 122(1)-122(2) and 122(4)-122(5) may be stressed (e.g., worn out) causing an unexpected and/or incorrect operation.

Each component is generally rated by a manufacturer to execute a specified number of instructions and/or perform a specified number of operations, as regulated by an oscillator or other clock. Operating the component 122(1)-122(2) and 122(4)-122(5) at a rate that is higher than a specified number of clock cycles is called overclocking. Overclocking may stress the component 122(1)-122(2) and 122(4)-122(5). The amount of overclocking may be determined per time period. Thus, a little overclocking may be tolerated, but overclocking for more than a specified period of time may be recorded as a stress event. Overclocking may include two or more factors. Such factors may include processor frequency and/or mode of operation. For example, a fault may cause a core to go to a high (turbo) frequency state. In another example, a fault may cause a core to go to a lower frequency state, such as may include a low power state, low frequency state, or sleep state. An overclocking fault may generally include a reduction or increase in the frequency state. Overclocking thus may generally indicate a clock related fault.

Transistors and other silicon components break down over time. This may be from semiconductor degradation, interaction with a surrounding environment, and/or other factor(s). An overall expected lifespan of the component 122(1)-122(2) and 122(4)-122(5) may be determined and monitored, such as may be based on number of clock cycles the component is subject to or overall time period of deployment. The component 122(1)-122(2) and 122(4)-122(5) may be considered stressed in response to determining a lifetime number of clock cycles has been surpassed or is about to be surpassed (e.g., within an hour, day, week, month, year, etc.).

A baseline power utilization of the component 122(1)-122(2) and 122(4)-122(5) may be determined or otherwise known. The current power utilization may be monitored, by the resiliency circuitry 116, and compared to the baseline. In response to determining the current power utilization deviates from the baseline by a threshold amount and/or for a specified period of time, the resiliency circuitry 116 may update a value or indicator that indicates an overall stress on the component 122(1)-122(2) and 122(4)-122(5).

The component liveliness may be determined by pinging the component 122(1)-122(2) and 122(4)-122(5) and determining an amount of time it takes for the component to respond, sometimes referred to as a heart rate indicator. In response to a specified number of responses to the pings being greater than (or equal to) the wear indicator may be updated.

Another sign of wear may include an amount of bandwidth to a memory and/or cache that is used by the component 122(1)-122(2) and 122(4)-122(5). As a component wears down, it may use less bandwidth of a memory or cache. A bandwidth threshold may be specified, and in response to the bandwidth usage of the components 122(1)-122(2) and 122(4)-122(5) being less than (or equal to) the threshold, such as for a specified period of time, the stress indicator may be updated by the resiliency circuitry 116.

Components may be configured to handle intermittent, non-prolonged time periods of stress over their stress threshold and/or handle a number of stress events over a life time. A smaller number of stressful events within a specified shorter time period and a larger number of stressful events within a specified longer time period may indicate that a core (or in the case of an FPGA the logic gates that implement a software core) is worn out. That is, there may be multiple wear thresholds, such as may be dependent on a period of time over which the wear indicators associated with the respective wear thresholds were accumulated.

The resiliency circuitry 116 may monitor one or more of the wear indicators and determine a wear value based on the monitored wear indicators. The wear value may include a combination, such as may include a sum, weighted sum, multiplication, division, or other combination of values associated with each wear indicator in the combination. In a formula:

wear_value=utilization_value O state_value O temperature_value O overclocking_value O aging_value O voltage_value O time_used_value O power_utilization_value O liveliness_value O bandwidth_usage_value where O represents a mathematical operation, such as may include a sum, weighted sum, multiplication, division, or the like. Each instance of the O symbol may represent a same or different operation as another instance of the O symbol. Further, not all values may be used in determining the wear_value. In such embodiments, the resiliency circuitry 116 may not monitor parameters associated with the wear indicator that are not used in the wear_value calculation. For example, if the temperature_value is not a part of the wear_value calculation, the resiliency circuitry 116 may not monitor the temperature.

Alternatively, the wear_ value may be an array of values associated with one or more of the wear indicators. Each entry in the array may include a one or a zero that indicates whether the wear indicator associated with the entry in the array exceeds a threshold. In response to determining that a specified number of entries in the array include entries set to one (for example) the resiliency circuitry 116 may determine that the component is stressed. In another embodiment, one or more of the wear indicators may be terminal and others may not be terminal, such as if they exceed a respective threshold. For example, if a component has exceeded its aging_value, it may be replaced without regard for other wear indicators. Such a wear indicator is considered a terminal wear indicator. A wear indicator that individually does not result in replacement of the component after exceeding the threshold, is a non-terminal wear indicator. A combination of non-terminal wear indicators exceeding respective thresholds, may cause a corresponding component to be replaced, such as in a same manner as a terminal wear indicator exceeding a threshold. For example, in response to determining the temperature_value, voltage_value, and liveliness_value are over threshold, the resiliency circuitry 116 may replace the corresponding component.

The resiliency circuitry 116 may determine the wear value, compare the wear value to a specified wear threshold, and swap a component that includes a wear value greater than (or equal to) the wear threshold. The wear values may be monitored and/or recorded by the resiliency circuitry 116 on a per component 122(1)-122(6) basis, such as to monitor one or more wear indicators for each of the components 122(1)-122(2) and 122(4)-122(5). The wear threshold for each of the components 122(1)-122(2) and 122(4)-122(5) may be the same and/or different. In response to determining the wear value is greater than the wear threshold, the data from the network channels may be redirected to the component 122(3), such as to help the component 122(3) perform the operations of the component 122(2). The data from the network channels 150 may be provided with or without the aid of the hypervisor 114 and/or an operating system (OS) of the host 104 (operating system not illustrated in FIG. 1).

The hypervisor 114, sometimes referred to as a virtual machine monitor (VMM), may include software, firmware, and/or hardware that creates and runs one or more virtual machines (WMs). The host 104 is the device on which the hypervisor operates, and the virtual machines 110 and 112 are guest machines. Each of the virtual machines 110 and 112 are emulations of computer systems. The virtual machines 110 and 112 provide functionality of a physical computer (e.g., the host 104), such as an entire machine (e.g., a system VM) or a process of a machine (e.g., a process VM).

In migrating operation(s) of the component 122(2) to the component 122(3), data may be provided to configure the component 122(3) to be in a state suitable for taking over operations of the component 122(2). In migrating operations of the component 122(2), data provided to the component 122(2) from which operations are redirected may be provided over the network channels 150, to the new component. The network channels 150 as illustrated include user data traffic, user control traffic, clean memory pages, and dirty memory pages, etc. Dirty memory is file-backed memory in which the contents have been modified, but not yet written back to a disk. The clean memory pages are file-backed and have been written back to disk. Clean and dirty memory are usually referred to with regard to virtual machines, specifically RAM of virtual machines and a memory (e.g., disk) of the machine hosting the virtual machine.

Note that while embodiments regard migrating operation(s) a single component to another single component, the resiliency circuitry 116 may detect a single fault or multiple faults, such as may occur in a specified time window. The fault(s) may be associated with one or more of the components. Operation(s) performed by the one or more components may be migrated to one or more other components. In one or more embodiments, operations of a single component may be migrated to multiple components. In one or more other embodiments, operation(s) of multiple components may be migrated to fewer components.

An advantage of one or more embodiments may include: (1) removing a need to migrate a virtual machine (VM) or VNF in the event of a component fault; (2) providing a local corrective action mechanism to correct faults (through substitution), such as may be hitless (e.g., hitless means the substitution of one component for another without disturbing underlying processes); (3) predicting and/or correcting faults before they occur; (4) improved capacity planning; (5) improved telemetry; (6) improved closed loop reaction; (7) improved placement and/or provisioning decision; (8) improved uptime, such as to help improve SLA satisfaction; and/or (8) reducing overhead of maintaining multiple redundant components.

In one or more embodiments, the wear indicators may include telemetry data and/or component wear indicators, such as from one or more sensors and/or counters. Telemetry data is data from a device that is provided to the resiliency circuitry 116. Component wear indicators are data produced by the resiliency circuitry 116 in monitoring the components 122(1)-122(2) and 122(4)-122(5). The resiliency circuitry 116 may use the telemetry, wear threshold(s), and/or other wear indicator data in determining the wear_value or other wear indicators.

The resiliency circuitry 116, sometimes implemented as an NFV management and organization (MANO) component, using the wear indicator monitoring, may have the ability to plan for capacity, but also to help balance an amount of wear on the components 122(1)-122(6). For example, operations of the component 122(2) may be migrated to the component 122(3) in response to determining the component 122(2) has a wear indicator above an intermediate wear threshold. The intermediate wear threshold may be used to help more evenly wear each of the components 122(1)-122(6). In such embodiments, the resiliency circuitry 116 may include one or more intermediate wear thresholds at which operation(s) of the components 122(1)-122(6) are migrated, and a terminal wear threshold at which operation(s) the components are migrated for a last time, respectively. In one or more embodiments, the resiliency circuitry 116 may reduce a wear on the component 122(1)-122(6), such as by reducing a clock rate of an oscillator or other device used by the component 122(1)-122(6) in performing operations. The clock rate may be reduced in response to the resiliency circuitry 116 determining that the wear_value is greater than (or equal to) an intermediate or other threshold. An operating voltage of the component 122(1)-122(6) may be reduced in response to the resiliency circuitry 116 determining that the wear_value is greater than (or equal to) an intermediate or other threshold.

Figure 2:
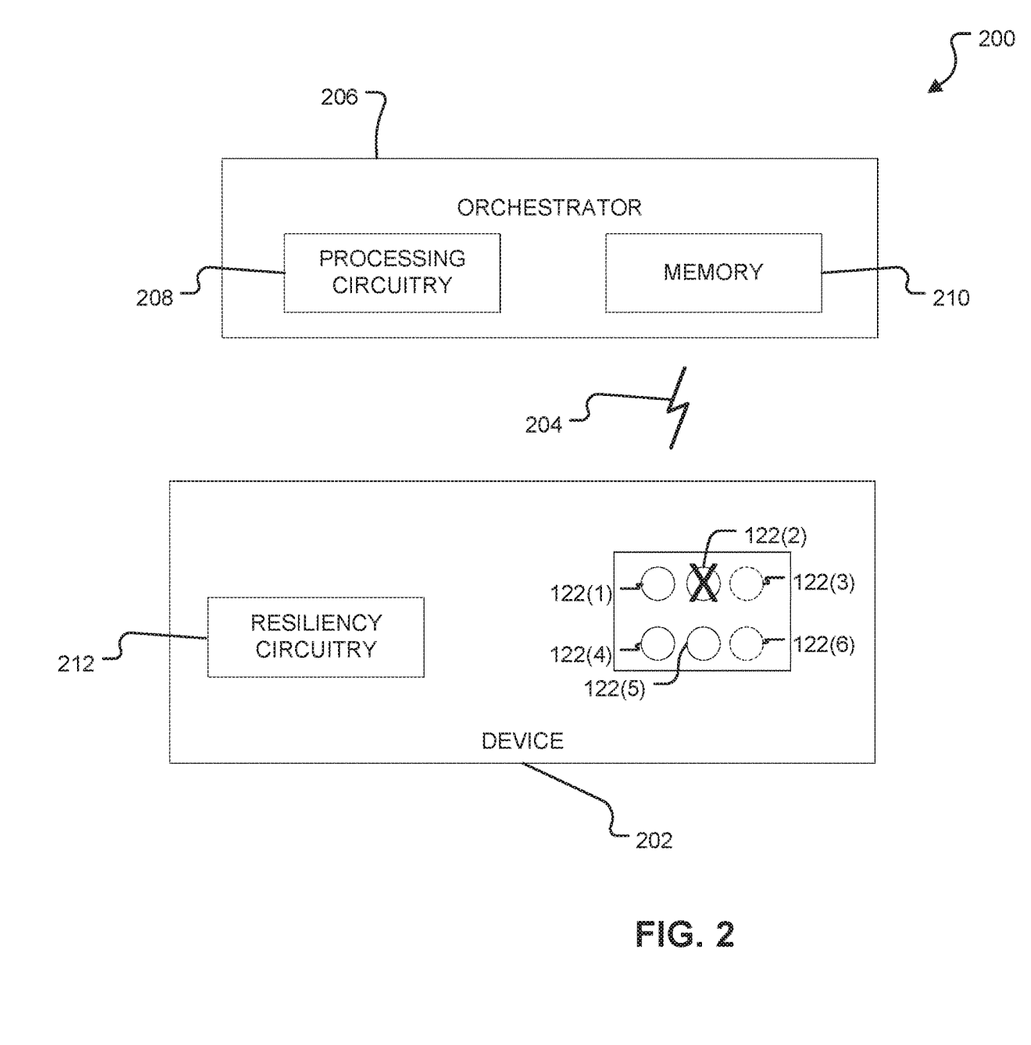
FIG. 2 illustrates, by way of example, a logical diagram of another embodiment of a component migration system.

FIG. 2 illustrates, by way of example, a logical diagram of an embodiment of a system 200 for migrating operation(s) of a component to another component. The system 200 as illustrated includes a device 202 and an orchestrator 206. The device 202 includes the resiliency circuitry 212 and the component(s) 122(1)-122(6). The orchestrator 206 as illustrated includes processing circuitry 208 and a memory 210. In the system 200, the resiliency circuitry 212 provides wear indicator data to the orchestrator 206. The processing circuitry 208 performs analysis on the wear indicator data provided by the resiliency circuitry 212. The processing circuitry 208 may include one or more electric and/or electronic components similar to those discussed with regard to the resiliency circuitry 116. The resiliency circuitry 212 may include one or more electric and/or electronic components similar to those discussed with regard to the resiliency circuitry 116.

The processing circuitry 208 determines one or more of a wear value, whether a component has failed or is about to fail based on the wear value (e.g., based on the determined wear value and/or a wear value threshold stored in the memory 210), a component to which to migrate the operations performed by the component determined to have failed or about to fail, and which network channels are to be re-routed and where the network channels are to be re-routed. The processing circuitry 208 may receive, from the device 202, a communication indicating that operations have been successfully migrated to another component or that migration has failed. In response to receiving a communication indicating that the migration has failed, the processing circuitry 208 may determine another component to which to migrate the operations. The processing circuitry 208 may perform operations discussed with regard to the resiliency circuitry 212.

The orchestrator 206 performs wear indicator data analysis and/or logging (on the memory 210). The orchestrator determines whether a component has failed or is about to fail. This is in contrast to the system 100 which includes the resiliency circuitry 116 to perform the analysis operations locally.

The device 202 may be a part of the host 104 or other device. The resiliency circuitry 212 is responsible for monitoring wear of a component and providing wear indicator data to the processing circuitry 208. The resiliency circuitry 212 may operate to monitor one or more wear indicators of the component(s) 122(1)-122(6) as previously discussed with regard to the resiliency circuitry 116.

In one or more embodiments, the resiliency circuitry 212 monitors wear indicator data, performs analysis on the wear indicator data, and/or determines if a component has failed or is about to fail. The resiliency circuitry 212 may provide one or more communications to the device 202 indicating that operations of a component are to be migrated to another component, such as previously discussed. In such embodiments, the processing circuitry 208 may determine a different component to which to migrate the operations and re-direct change network channels previously destined for the component that has failed or is about to fail to the different component. the device 202 and/or the resiliency circuitry 116 then redirects the network channel 150 data to the component to which the operation(s) are migrated. The processing circuitry 208 may provide one or more communications to a device (e.g., a switch, hub, router, or the like) in the network, such as to cause the device in the network to redirect traffic to the different component.

Figure 3:
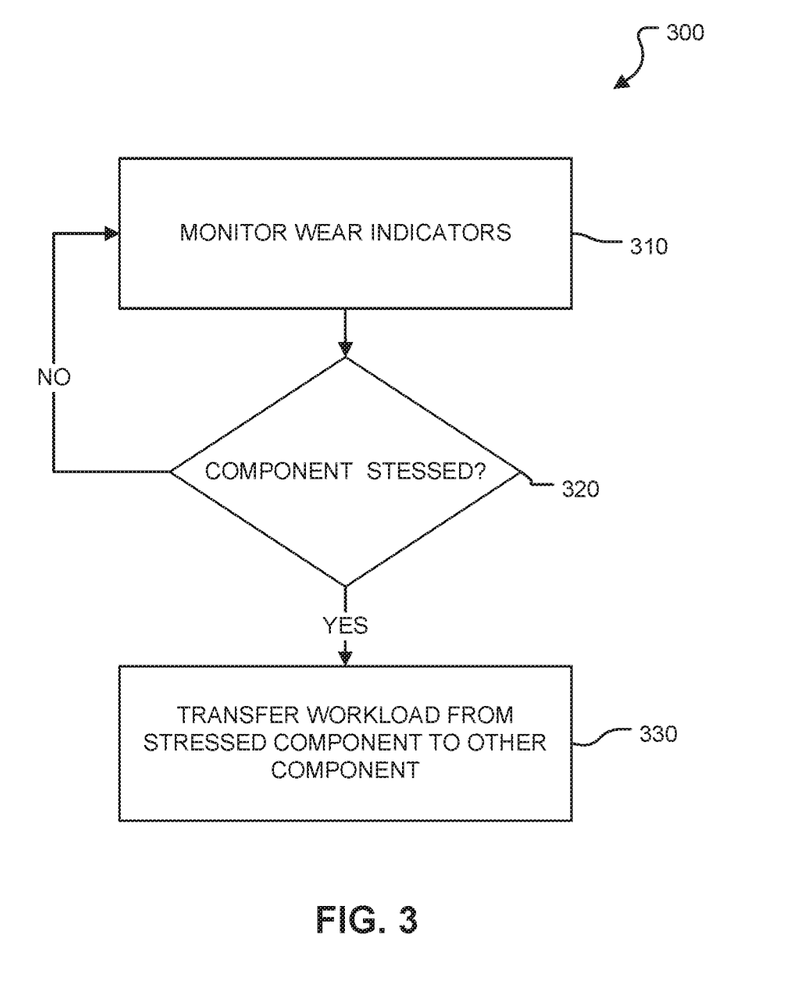
FIG. 3 illustrates, by way of example, a logical diagram of an embodiment of a method for migrating a component into and out of a computing device or system.

FIG. 3 illustrates, by way of example, a logical diagram of an embodiment of a method 300 for migrating operation(s) of a component to another component of a computing device or system. The method 300 as illustrated monitoring wear indicators, at operation 310; determining whether the component is stressed, at operation 320; continuing to monitor the wear indicators, at operation 310, in response to determining the component is not stressed; and in response to determining the component is stressed, at operation 320, migrating a workload from the stressed component to another component (e.g., a component that is currently unused or may otherwise be able to carry the workload of the stressed component).

The operation 310 may include monitoring at least one of component utilization, state, overclocking, temperature, voltage, power utilization, and memory bandwidth indicator. The method 300 may further include determining a wear value based on two or more of the component utilization, state, overclocking, temperature, voltage, power utilization, and memory bandwidth indicator. The method 300 may further include comparing the determined wear value to a wear value threshold. The method 300 may further include determining the first component is stressed in response to determining the wear value is greater than, or equal to, the wear value threshold. The method 300 may include, wherein the wear value threshold is one of a plurality of wear value thresholds including an intermediate wear value threshold and a terminal wear value threshold. The method 300 may further include comparing the determined wear value to each of the wear value thresholds. The method 300 may further include, in response to determining the wear value is greater than the intermediate wear value threshold and below the terminal wear value threshold, transfer the workload associated with the first component to a second component with a wear value less than the intermediate wear value threshold.

The operation 310 may further include monitoring whether the first component has exceeded a life limit (e.g., a terminal wear value threshold). The method 300 may further include, wherein the workload includes a virtual network function. The operation 330 may further include transferring a compute state and a link state of the first component to the second component. The operation 330 may further include redirecting at least one of user data traffic, user control traffic, memory pages, and dirty memory pages to the second component.

Figure 4:
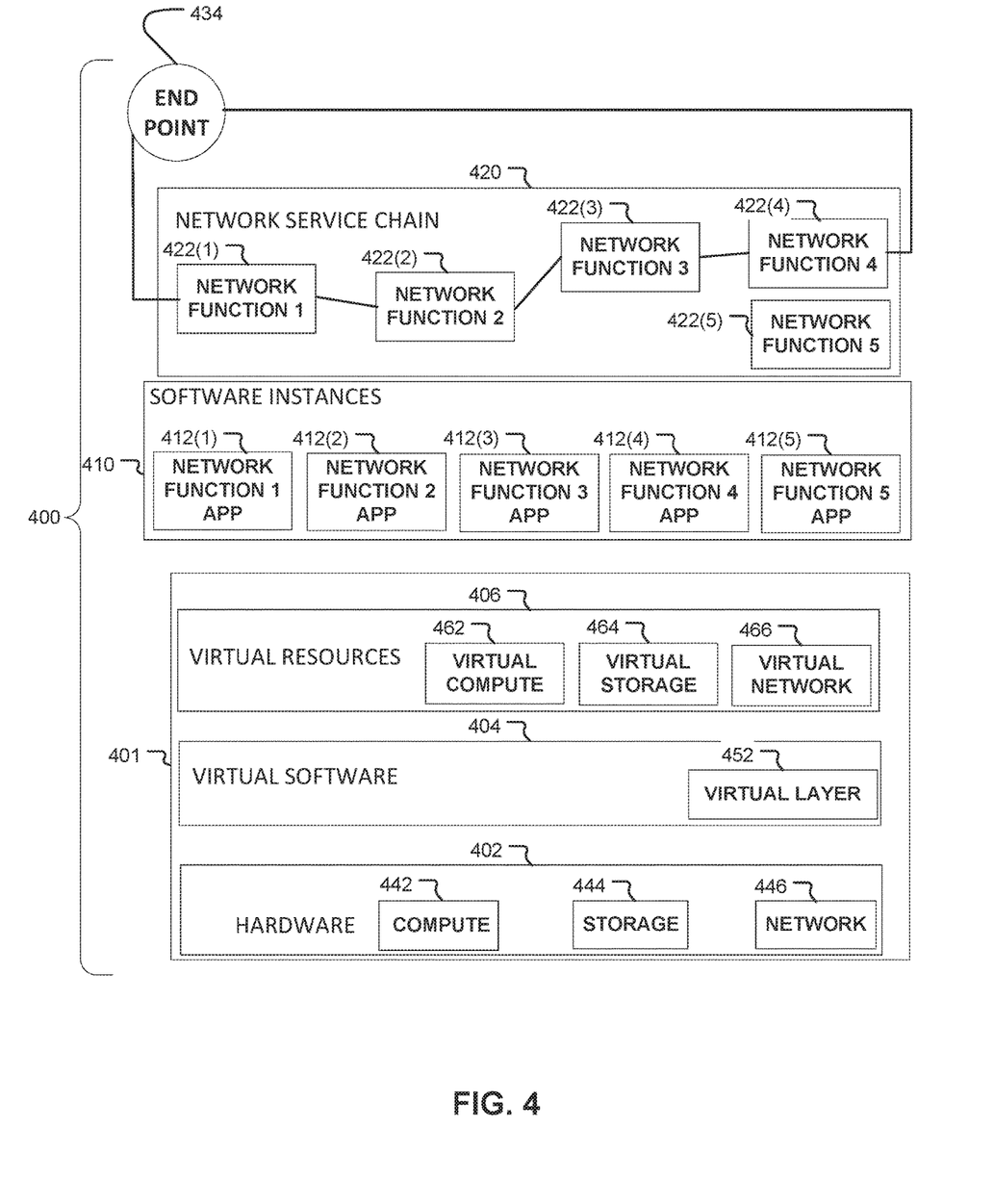
FIG. 4 illustrates, by way of example, a logical block diagram of an embodiment of a network.

FIG. 4 illustrates, by way of example, a logical block diagram of an embodiment of a network 400. The network 400 as illustrated includes a host 401, software instances 410, a network service chain 420, and an endpoint 434. The host 401 may include one or more components of the host 104, such as the resiliency circuitry 116, the hypervisor 114, virtual machines 110 and/or 112. The host 401 may be a host server unit in a datacenter or a part of another computing device or devices. The host 401 is illustrated as including a network function virtualization infrastructure. The host 401 as illustrated includes hardware 402, virtual software 404 hosted by the hardware 402, and virtual resources 406 available for access by one or more clients, for example the endpoint 434. The orchestrator device 206 may be coupled to the network 400 and perform operations as discussed with regard to FIG. 2.

The hardware 402 as illustrated includes compute hardware 442, storage hardware 444, and network hardware 446. The compute hardware 442 may include the components 122(1)-122(6), the resiliency circuitry 116, the hypervisor 114, one or more components of FIG. 5, or the like. The storage hardware 444 may include a memory, such as a volatile and/or non-volatile memory. The storage hardware 444 may include a memory management unit (MMU), such as to facilitate access to the memory of the storage hardware 444. The MMU may translate virtual memory addresses to physical memory addresses. The network hardware 446 may include devices to connect the host 401 to the endpoint 434. The network hardware 446 may include one or more gateways, routers, bridges, access points, modems, switches, cables, hubs, network interface controllers, firewalls, proxy servers, or the like.

The virtual software 404 as illustrated includes a virtual layer 452. The virtual layer 452 implements virtual machines, such as the virtual machines 110 and/or 112. The virtual resources 406 as illustrated include virtual compute resources 462, virtual storage resources 464, and virtual network resources 466. The virtual compute resources 462 may include the software instances 410. The virtual compute resources 462 are the services provided by the virtual software 404. The virtual storage of the virtual storage resources 464 maps to memory spaces in the storage hardware 444 to provide a user of the virtual machine with an ability to persistently store data. The virtual network resources 466 allow a first virtual machine to communicate with a second virtual machine.

The software instances 410 as illustrated include a plurality of network feature applications 412(1), 412(2), 412(3), 412(4), and 412(5). Each of the feature applications 412(1)-412(5) may provide functionality that is decoupled from underlying hardware. Being decoupled from underlying hardware means that there is no dedicated hardware configured to provide the functionality of the network feature applications 412(1)-412(5).

The network service chain 420 as illustrated includes a plurality of network functions 422(1), 422(2), 422(3), 422 (4), and 422(5). The network functions 422(1)-422(5) may be virtual network functions (VNFs). The network functions 422(1)-422(5) may be coupled to each other, with some spare network functions. In response to determining a wear value of compute hardware 442 on which one or more of the network functions 422(1)-422(5) operates exceeds a wear threshold (e.g., an intermediate or terminal wear threshold), the network function 422(1)-422(5) may be ported over to other hardware, such as by instantiating a spare network function as the network function that is running on the stressed hardware.

The endpoint 434 may include a client, such as a computing device (e.g., a laptop, desktop, tablet, or other computer, smart phone, or other computing device). The endpoint 434 may access one or more of the VNFs provided by the network 400.

Figure 5:
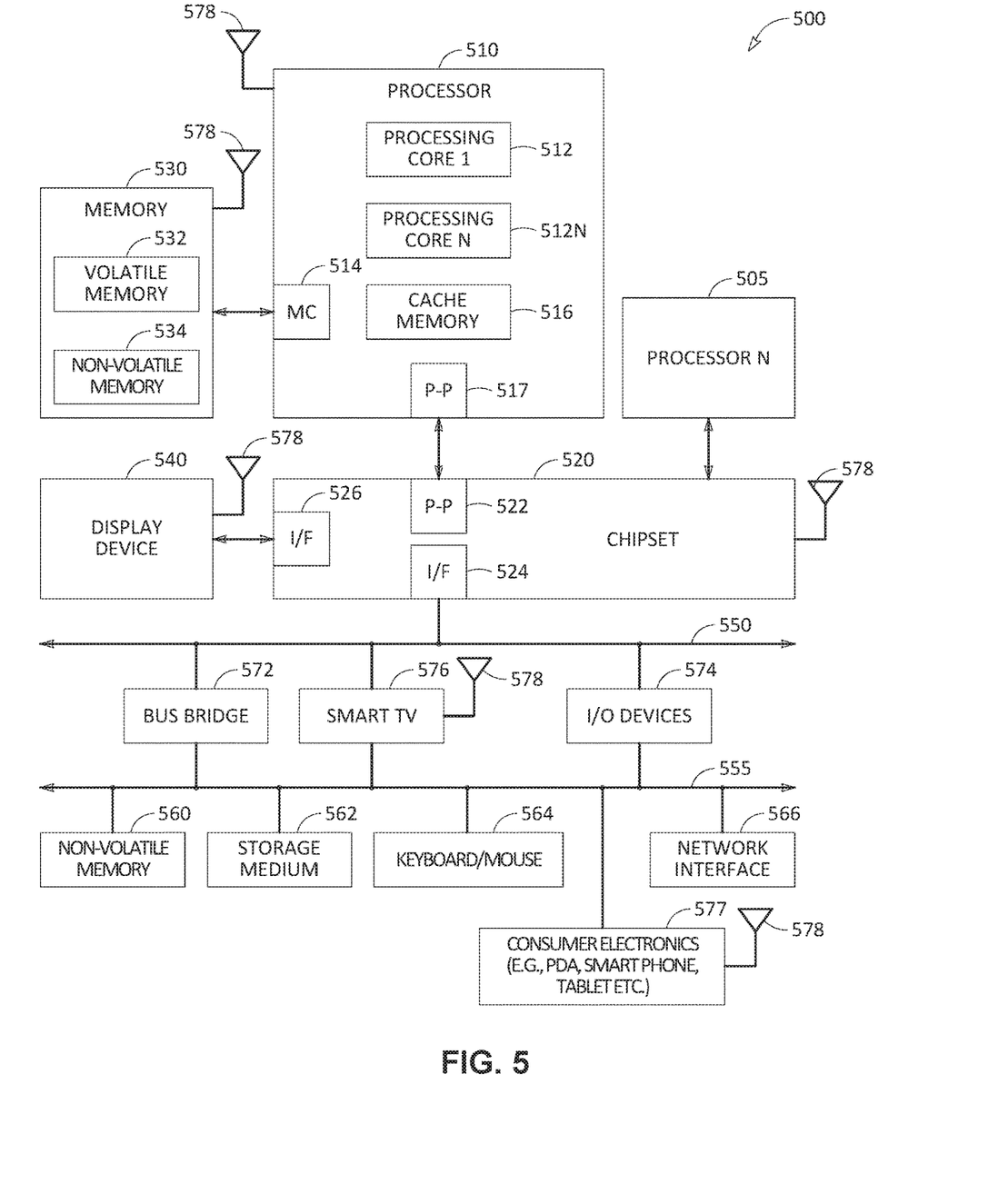
FIG. 5 illustrates, by way of example, a diagram of an embodiment of a computing device.

FIG. 5 illustrates, by way of example, a diagram of an embodiment of a computing device 500. One or more of the datacenter 102, the host 104, the components 122(1)-122(6), resiliency circuitry 116, hypervisor 114, compute hardware 442, storage hardware 444, network hardware 446, and endpoint 434 may include one or more of the components of the device 500. In one embodiment, the device 500 includes, but is not limited to, a desktop computer, a laptop computer, a netbook, a tablet, a notebook computer, a personal digital assistant (PDA), a server, a workstation, a cellular telephone, a mobile computing device, a smart phone, an Internet appliance or any other type of computing device. In some embodiments, the device 500 is a system on a chip (SOC) system.

In one embodiment, processor 510 has one or more processing cores 512 and 512N, where 512N represents the Nth processor core inside processor 510 where N is a positive integer. In one embodiment, device 500 includes multiple processors including 510 and 505, where processor 505 has logic similar or identical to the logic of processor 510. In some embodiments, processing core 512 includes, but is not limited to, pre-fetch logic to fetch instructions, decode logic to decode the instructions, execution logic to execute instructions and the like. In some embodiments, processor 510 has a cache memory 516 to cache instructions and/or data for device 500. Cache memory 516 may be organized into a hierarchal structure including one or more levels of cache memory.

In some embodiments, processor 510 includes a memory controller 514, which is operable to perform functions that enable the processor 510 to access and communicate with memory 530 that includes a volatile memory 532 and/or a non-volatile memory 534, in some embodiments, processor 510 is coupled with memory 530 and chipset 520. Processor 510 may also be coupled to a wireless antenna 578 to communicate with any device configured to transmit and/or receive wireless signals. In one embodiment, the wireless antenna interface 578 operates in accordance with, but is not limited to, the IEEE 802.11 standard and its related family, Home Plug AV (HPAV), Ultra Wide Band (UWB), Bluetooth, WiMax, or any form of wireless communication protocol.

In some embodiments, volatile memory 532 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. Non-volatile memory 534 includes, but is not limited to, flash memory, phase change memory (PCM), read-only memory (ROM), electrically erasable programmable read-only memory (EEPROM), or any other type of non-volatile memory device.

Memory 530 stores information and instructions to be executed by processor 510. In one embodiment, memory 530 may also store temporary variables or other intermediate information while processor 510 is executing instructions. In the illustrated embodiment, chipset 520 connects with processor 510 via Point-to-Point (PtP or P-P) interfaces 517 and 522. Chipset 520 enables processor 510 to connect to other elements in device 500. In some embodiments of the invention, interfaces 517 and 522 operate in accordance with a PtP communication protocol such as the Intel® QuickPath Interconnect (QPI) or the like. In other embodiments, a different interconnect may be used.

In some embodiments, chipset 520 is operable to communicate with processor 510, 505N, display device 540, and other devices 572, 576, 574, 560, 562, 564, 566, 577, etc. Chipset 520 may also be coupled to a wireless antenna 578 to communicate with any device configured to transmit and/or receive wireless signals.

Chipset 520 connects to display device 540 via interface 526. Display device 540 may be, for example, a liquid crystal display (LCD), a plasma display, cathode ray tube (CRT) display, or any other form of visual display device. In some embodiments of the invention, processor 510 and chipset 520 are merged into a single SOC. In addition, chipset 520 connects to one or more buses 550 and 555 that interconnect various elements 574, 560, 562, 564, and 566. Buses 550 and 555 may be interconnected together via a bus bridge 572. In one embodiment, chipset 520 couples with a non-volatile memory 560, a mass storage device(s) 562, a keyboard/mouse 564, and a network interface 566 via interface 524 and/or 526, smart TV 576, consumer electronics 577, etc.

In one embodiment, mass storage device 562 includes, but is not limited to, a solid state drive, a hard disk drive, a universal serial bus flash memory drive, or any other form of computer data storage medium. In one embodiment, network interface 566 is implemented by any type of well-known network interface standard including, but not limited to, an Ethernet interface, a wireless interface and/or any other suitable type of interface. In one embodiment, the wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 5 are depicted as separate blocks within the device 500, the functions performed by some of these blocks may be integrated within a single semiconductor circuit or may be implemented using two or more separate integrated circuits. For example, although cache memory 516 is depicted as a separate block within processor 510, cache memory 516 (or selected aspects of 516) may be incorporated into processing core 512.

To better illustrate the methods and device disclosed herein, a non-limiting list of example embodiments is provided here:

Example 1 may include a host server unit, the host server unit comprising a processor having a plurality of processor cores, and resiliency circuitry to monitor a wear indicator associated with a processor core of the processor cores, and in response to an indication that the processor core is stressed, (1) transfer a workload associated with the processor core to a spare processor core or reduce a rate of an oscillator that clocks the processor core.

In Example 2, Example 1 may include, wherein the resiliency circuitry is to transfer the workload associated with the processor core to the spare processor core.

In Example 3, Example 2 may include, wherein the spare processor core is one of the plurality of processor cores.

In Example 4, at least one of Examples 2-3 may include, wherein the spare processor core is included on a second host server unit.

In Example 5, at least one of Examples 2-4 may include, wherein the wear indicator indicates that the processor core has exceeded a life limit.

In Example 6, at least one of Examples 2-5 may include, wherein the workload includes a virtual network function.

In Example 7, at least one of Examples 2-6 may include, wherein to transfer the workload associated with the processor core to the spare processor core includes the resiliency circuitry to transfer a processor state and a link state of the processor to the spare processor core.

In Example 8, at least one of Examples 2-7 may include, wherein to transfer the workload associated with the processor core to the spare processor core includes the resiliency circuitry to redirect at least one of user data traffic, user control traffic, memory pages, and dirty memory pages to the spare processor core.

In Example 9, at least one of Examples 1-8 may include, wherein the wear indicator indicates at least one of core utilization, core state, temperature, power utilization, voltage, memory bandwidth indicator, or cache utilization indicator.

In Example 10, Example 9 may include, wherein resiliency circuitry is to determine a wear value based on two or more of the core utilization, core state, temperature, power utilization, voltage, memory bandwidth indicator, or cache utilization indicator, compare the determined wear value to a wear value threshold, and determine the processor core is stressed in response to determining the wear value is greater than, or equal to, the wear value threshold.

In Example 11, at least one of Examples 9-10 may include, wherein the wear value threshold is one of a plurality of wear value thresholds including an intermediate wear value threshold and an end of life wear value threshold, and wherein the resiliency circuitry is to compare the determined wear value to each of the wear value thresholds, and in response to determining the wear value is greater than the intermediate wear value threshold and below the end of life wear value threshold, transfer the workload associated with the processor core to a spare processor core with a wear value less than the intermediate wear value threshold.

Example 12 may include a method to transfer a workload from a first component to a second component of a same device, the method comprising monitoring a wear indicator associated with the first component, and in response to an indication that the first component is stressed based on the wear indicator, transferring a workload of the first component to the second component.

In Example 13, Example 12 may include, wherein monitoring the wear indicator includes monitoring at least one of component utilization, state, overclocking, temperature, voltage, power utilization, and memory bandwidth indicator.

In Example 14, Example 13 may include determining a wear value based on two or more of the component utilization, state, overclocking, temperature, voltage, power utilization, and memory bandwidth indicator, comparing the determined wear value to a wear value threshold, and determining the first component is stressed in response to determining the wear value is greater than, or equal to, the wear value threshold.

In Example 15, Example 14 may include, wherein the wear value threshold is one of a plurality of wear value thresholds including an intermediate wear value threshold and an end of life wear value threshold, and the method further comprising comparing the determined wear value to each of the wear value thresholds, and in response to determining the wear value is greater than the intermediate wear value threshold and below the end of life wear value threshold, transferring the workload associated with the first component to a third component with a wear value less than the intermediate wear value threshold.

In Example 16, at least one of Examples 12-15 may include, wherein monitoring the wear indicator includes monitoring whether the first component has exceeded a life limit.

In Example 17, at least one of Examples 12-16 may include, wherein the workload includes a virtual network function.

In Example 18, at least one of Examples 12-17 may include, wherein transferring the workload associated with the first component to the second component includes transferring a compute state and a link state to the second component.

In Example 19, at least one of Examples 12-18 may include, wherein transferring the workload associated with the first component to the second component includes redirecting at least one of user data traffic, user control traffic, memory pages, and dirty memory pages to the second component.

Example 20 may include at least one non-transitory machine-readable medium including instructions that, when executed by a virtual machine monitor, cause the virtual machine monitor to perform operations comprising monitoring a wear indicator associated with a processor core of a plurality of processor cores, and in response to an indication that the processor core is stressed, (1) transferring a workload associated with the processor core to a spare processor core or (2) reducing a rate of an oscillator that clocks the processor core.

In Example 21, Example 20 may include, wherein the operations further comprise transferring the workload associated with the processor core to the spare processor core.

In Example 22, Example 21 may include, wherein the spare processor core is part of a same processor as the processor core.

In Example 23, at least one of Examples 21-22 may include, wherein the wear indicator indicates that the processor core has exceeded a life limit.

In Example 24, at least one of Examples 21-23 may include, wherein the workload includes a virtual network function.

In Example 25, at least one of Examples 21-24 may include, wherein transferring the workload associated with the processor core to the spare processor core includes transferring a processor state and a link state of the processor to the spare processor core.

In Example 26, at least one of Examples 21-25 may include, wherein transferring the workload associated with the processor core to the spare processor core includes redirecting at least one of user data traffic, user control traffic, memory pages, and dirty memory pages to the spare processor core.

In Example 27, at least one of Examples 20-26 may include, wherein the wear indicator indicates at least one of core utilization, core state, temperature, power utilization, voltage, memory bandwidth indicator, and cache utilization indicator.

In Example 28, Example 27 may include, wherein the operations further comprise determining a wear value based on two or more of the core utilization, core state, temperature, power utilization, voltage, memory bandwidth indicator, and cache utilization indicator, comparing the determined wear value to a wear value threshold, and determining the processor core is stressed in response to determining the wear value is greater than, or equal to, the wear value threshold.

In Example 29, Example 28 may include, wherein the wear value threshold is one of a plurality of wear value thresholds including an intermediate wear value threshold and an end of life wear value threshold, and the operations further comprise comparing the determined wear value to each of the wear value thresholds, and in response to determining the wear value is greater than the intermediate wear value threshold and below the end of life wear value threshold, transferring the workload associated with the processor core to a spare processor core with a wear value less than the intermediate wear value threshold.

Example 30 may include an orchestrator device comprising a memory including a wear indicator threshold stored thereon, processing circuitry coupled to the memory, the processing circuitry to receive wear indicator data corresponding to a first circuitry component, determine, based on the wear indicator data and the wear indicator threshold, that the first circuitry component has failed or is about to fail; and migrate a workload of the component to a second circuitry component.

In Example 31, Example 30 may further include, wherein the received data is from resiliency circuitry of an apparatus including the first and second components.

In Example 32, Example 31 may further include, wherein the apparatus is a host server unit.

In Example 33, at least one of Examples 30-32 may further include, wherein the wear indicator indicates that the first circuitry component has exceeded a life limit.

In Example 34, at least one of Examples 30-33 may further include, wherein the workload includes a virtual network function.

In Example 35, at least one of Examples 30-34 may further include, wherein migration of the workload of the first circuitry component to the second circuitry component includes transfer of a component state and a link state of the first circuitry component to the second circuitry component.

In Example 36, at least one of Examples 30-35 may further include, wherein migration of the workload of the first circuitry component to the second circuitry component includes a redirect of at least one of user data traffic, user control traffic, memory pages, and dirty memory pages to the second circuitry component.

In Example 37, at least one of Examples 30-36 may further include, wherein the wear indicator indicates at least one of first circuitry component utilization, state, temperature, power utilization, voltage, memory bandwidth indicator, or cache utilization indicator.

In Example 38, Example 37 may further include, wherein the processing circuitry is further to determine a wear value based on two or more of the core utilization, core state, temperature, power utilization, voltage, memory bandwidth indicator, or cache utilization indicator, compare the determined wear value to the wear value threshold, and determine the first circuitry component has failed or is about to fail in response to determining the wear value is greater than, or equal to, the wear value threshold.

In Example 39, at least one of Examples 37-38 may further include, wherein the wear value threshold is one of a plurality of wear value thresholds on the memory, the wear value thresholds including an intermediate wear value threshold and an end of life wear value threshold, and wherein the processing circuitry is to compare the determined wear value to each of the wear value thresholds, and in response to determining the wear value is greater than the intermediate wear value threshold and below the end of life wear value threshold, transfer the workload associated with the first circuitry component to the second circuitry component with a wear value less than the intermediate wear value threshold.

In Example 40, at least one of Examples 30-39 may further include, wherein the first and second circuitry components are each (1) processor cores or (2) portions of a field programmable gate array (FPGA).

In Example 41, at least one of Examples 30-40, wherein the orchestrator device is further to receive, from an apparatus on which the second circuitry component resides, a communication indicating that the workload was successfully migrated to the second circuitry component or that the migration has failed.

In Example 42, Example 36 may further include, wherein redirection of at least one of user data traffic, user control traffic, memory pages, and dirty memory pages to the second circuitry component includes providing a communication to a switch, hub, or router of the network that causes the switch, hub, or router to direct traffic address to the first circuitry component to the second circuitry component.

Example 43 includes a method to transfer a workload from a first component to a second component of a device, the method comprising receiving wear indicator data corresponding to a first circuitry component, determining, based on the wear indicator data and the wear indicator threshold, that the first circuitry component has failed or is about to fail, and migrating a workload from the first circuitry component to a second circuitry component.

In Example 44, Example 43 may further include receiving, from an apparatus on which the second circuitry component resides, a communication indicating that the workload was successfully migrated to the second circuitry component or that the migration has failed.

In Example 45, at least one of Examples 43-44 may further include, wherein the received data is from resiliency circuitry of an apparatus including the first and second circuitry components.

In Example 46, at least one of Examples 43-45 may further include, wherein the wear indicator data indicates that the first circuitry component has exceeded a life limit.

In Example 47, at least one of Examples 44-46 may further include, wherein migration of the workload of the first circuitry component to the second circuitry component includes transfer of a first circuitry component state and a link state of the first circuitry component to the second circuitry component.

In Example 48, Example 47 may further include, wherein migration of the workload of the first circuitry component to the second circuitry component includes redirecting of at least one of user data traffic, user control traffic, memory pages, and dirty memory pages to the second circuitry component.

In Example 49, Example 48 may further include, wherein redirection of at least one of user data traffic, user control traffic, memory pages, and dirty memory pages to the second circuitry component includes providing a communication to a switch, hub, or router of the network that causes the switch, hub, or router to direct traffic address to the first circuitry component to the second circuitry component.

In Example 50, at least one of Examples 43-49 may further include, wherein the wear indicator indicates at least one of first circuitry component utilization, state, temperature, power utilization, voltage, memory bandwidth indicator, or cache utilization indicator.

In Example 51, at least one of Examples 43-50 may further include determining a wear value based on two or more of the core utilization, core state, temperature, power utilization, voltage, memory bandwidth indicator, or cache utilization indicator, comparing the determined wear value to the wear value threshold, and determining the first circuitry component has failed or is about to fail in response to determining the wear value is greater than, or equal to, the wear value threshold.

In Example 52, Example 51 may further include, wherein the wear value threshold is one of a plurality of wear value thresholds on the memory, the wear value thresholds including an intermediate wear value threshold and an end of life wear value threshold, and wherein the method further comprises comparing the determined wear value to each of the wear value thresholds, and in response to determining the wear value is greater than the intermediate wear value threshold and below the end of life wear value threshold, transferring the workload associated with the first circuitry component to the second circuitry component with a wear value less than the intermediate wear value threshold.

In Example 53, at least one of Examples 43-52 may further include, wherein the first and second circuitry components are each (1) processor cores or (2) portions of a field programmable gate array (FPGA).

In Example 54, at least one of Examples 43-53 may further include, wherein the first component is a first processor core and the second component is a second processor core.

Example 55 includes a non-transitory machine-readable medium including instructions that, when executed by a machine, cause the machine to perform operations comprising receiving wear indicator data corresponding to a first circuitry component, determining, based on the wear indicator data and the wear indicator threshold, that the first circuitry component has failed or is about to fail, and migrating a workload from the first circuitry component to a second circuitry component.

In Example 56, Example 55 may further include, wherein the operations further comprise receiving, from an apparatus on which the second circuitry component resides, a communication indicating that the workload was successfully migrated to the second circuitry component or that the migration has failed.

In Example 57, at least one of Examples 55-56 may further include, wherein the received data is from resiliency circuitry of an apparatus including the first and second circuitry components.

In Example 58, at least one of Examples 55-57 may further include, wherein the wear indicator data indicates that the first circuitry component has exceeded a life limit.

In Example 59, at least one of Examples 56-58 may further include, wherein migration of the workload of the first circuitry component to the second circuitry component includes transfer of a first circuitry component state and a link state of the first circuitry component to the second circuitry component.

In Example 60, Example 59 may further include, wherein migration of the workload of the first circuitry component to the second circuitry component includes redirecting of at least one of user data traffic, user control traffic, memory pages, and dirty memory pages to the second circuitry component.

In Example 61, at least one of Examples 59-60 may further include, wherein redirection of at least one of user data traffic, user control traffic, memory pages, and dirty memory pages to the second circuitry component includes providing a communication to a switch, hub, or router of the network that causes the switch, hub, or router to direct traffic address to the first circuitry component to the second circuitry component.

In Example 62, at least one of Examples 55-61 may further include, wherein the wear indicator indicates at least one of first circuitry component utilization, state, temperature, power utilization, voltage, memory bandwidth indicator, or cache utilization indicator.

In Example 63, at least one of Examples 55-62 may further include, wherein the operations further comprise determining a wear value based on two or more of the core utilization, core state, temperature, power utilization, voltage, memory bandwidth indicator, or cache utilization indicator, comparing the determined wear value to the wear value threshold, and determining the first circuitry component has failed or is about to fail in response to determining the wear value is greater than, or equal to, the wear value threshold.

In Example 64, at least one of Examples 55-63 may further include, wherein the wear value threshold is one of a plurality of wear value thresholds on the memory, the wear value thresholds including an intermediate wear value threshold and an end of life wear value threshold, and wherein the operations further comprise comparing the determined wear value to each of the wear value thresholds, and in response to determining the wear value is greater than the intermediate wear value threshold and below the end of life wear value threshold, transferring the workload associated with the first circuitry component to the second circuitry component with a wear value less than the intermediate wear value threshold.

In Example 65, at least one of Examples 55-64 may further include, wherein the first and second circuitry components are each (1) processor cores or (2) portions of a field programmable gate array (FPGA).

In Example 66, at least one of Examples 55-65 may further include, wherein the first component is a first processor core and the second component is a second processor core.

These examples are intended to provide non-limiting examples of the present subject matter—they are not intended to provide an exclusive or exhaustive explanation. The detailed description above is included to provide further information about the present devices, and methods.

The above detailed description includes references to the accompanying drawings, which form a part of the detailed description. The drawings show, by way of illustration, specific embodiments in which the disclosure may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein," Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

As used in this application and in the claims, a list of items joined by the term "and/or" may mean any combination of the listed items. For example, the phrase "A, B and/or C" may mean A; C; A and B; A and C; B and C; or A, B and C. As used in this application and in the claims, a list of items joined by the term "at least one of" may mean any combination of the listed terms. For example, the phrase "at least one of A, B or C" may mean A; B; C; A and B; A and C; B and C; or A, B and C.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim, Rather, inventive subject matter may lie in less than all features of a particular disclosed embodiment. Thus, the following claims are hereby incorporated into the Detailed Description, with each claim standing on its own as a separate embodiment, and it is contemplated that such embodiments may be combined with each other in various combinations or permutations. The scope of the disclosure should be determined with reference to the appended claims, along with the full scope of equivalents to which such claims are entitled.

What is claimed is:

1. An orchestrator device, the orchestrator device comprising:
a memory including a wear indicator threshold stored thereon;
processing circuitry coupled to the memory, the processing circuitry to:
receive wear indicator data corresponding to a first circuitry component, the wear indicator data including at least one terminal type data and multiple non-terminal types of data, the terminal type data, when above the wear indicator threshold, indicates the first circuitry component has no lifespan remaining, the non-terminal types of data indicate, when multiple of the non-terminal types of data are greater than the wear threshold, that the first circuitry component has no lifespan remaining;
determine, based on the wear indicator data and the wear indicator threshold, that the first circuitry component has failed or is about to fail; and
migrate a workload from the first circuitry component to a second circuitry component.

2. The orchestrator device of claim 1, wherein the orchestrator device is further to receive, from an apparatus on which the second circuitry component resides, a communication indicating that the workload was successfully migrated to the second circuitry component or that the migration has failed.

3. The orchestrator device of claim 2, wherein the wear indicator data indicates that the first circuitry component has exceeded a life limit.

4. The orchestrator device of claim 2, wherein migration of the workload of the first circuitry component to the second circuitry component includes transfer of a first circuitry component state and a link state of the first circuitry component to the second circuitry component.

5. The orchestrator device of claim 2; wherein migration of the workload of the first circuitry component to the second circuitry component includes the redirect of user data traffic, user control traffic, memory pages, and dirty memory pages to the second circuitry component.

6. The orchestrator device of claim 5, wherein redirection of at least one of user data traffic, user control traffic, memory pages, and dirty memory pages to the second circuitry component includes providing a communication to a switch, hub, or router of the network that causes the switch, hub, or router to direct traffic address to the first circuitry component to the second circuitry component.

7. The orchestrator device of claim 1, wherein the received data is from resiliency circuitry of an apparatus including the first and second circuitry components.

8. The orchestrator device of claim 1, wherein the wear indicator indicates first circuitry component utilization, state, temperature, power utilization, voltage; memory bandwidth indicator, or cache utilization indicator.

9. The orchestrator device of claim 8, wherein the processing circuitry is further to:
determine a wear value based on two or more of an amount of time a voltage drawn by the first circuitry component is greater than a third threshold value and less than a fourth threshold value, an amount of time an oscillator of the first circuitry component is greater than a specified number of clock cycles per time period, an amount of time the first circuitry component consumes memory bandwidth less than a fifth threshold, or a number of times the first circuitry component fails to respond a ping within a specified time period;
compare the determined wear value to the wear value threshold; and
determine the first circuitry component has failed or is about to fail in response to determining the wear value is greater than, or equal to, the wear value threshold.

10. The orchestrator device of claim 8, wherein the wear value threshold is one of a plurality of wear value thresholds on the memory, the wear value thresholds including an intermediate wear value threshold and an end of life wear value threshold, and wherein the processing circuitry is to:
compare the determined wear value to each of the wear value thresholds; and
in response to determining the wear value is greater than the intermediate wear value threshold and below the end of life wear value threshold, transfer the workload associated with the first circuitry component to the second circuitry component with a wear value less than the intermediate wear value threshold.

11. The orchestrator device of claim 1, wherein the first and second circuitry components are each (1) processor cores or (2) portions of a field programmable gate array (FPGA).

12. The orchestrator device of claim 1, wherein the first component is a first processor core and the second component is a second processor core.

13. A method to transfer a workload from a first component to a second component of a device, the method comprising:
receiving wear indicator data corresponding to a first circuitry component, the wear indicato data including at least one terminal type data and multiple non-terminal types of data, the terminal type data, when above the wear indicator threshold, indicates the first circuitry component has no lifespan remaining, the non-terminal types of data indicate when multiple of the non-terminal types of data are greater than the wear threshold, that the first circuitry component has no lifespan remaining;
determining, based on the wear indicator data and the wear indicator threshold, that the first circuitry component has failed or is about to fail; and
migrating a workload from the first circuitry component to a second circuitry component.

14. The method of claim 13, further comprising receiving, from an apparatus on which the second circuitry component resides; a communication indicating that the workload was successfully migrated to the second circuitry component or that the migration has failed.

15. The method of claim 13, wherein the wear indicator indicates first circuitry component utilization, state, temperature, power utilization, voltage, memory bandwidth indicator, or cache utilization indicator.

16. The method of claim 15, further comprising:
determining a wear value based on two or more of the core utilization, core state, temperature, power utilization, voltage, memory bandwidth indicator, or cache utilization indicator;
comparing the determined wear value to the wear value threshold; and
determining the first circuitry component has failed or is about to fail in response to determining the wear value is greater than, or equal to, the wear value threshold.

17. The method of claim 15, wherein the wear value threshold is one of a plurality of wear value thresholds on the memory, the wear value thresholds including an intermediate wear value threshold and an end of life wear value threshold, and wherein the method further comprises:
comparing the determined wear value to each of the wear value thresholds; and
in response to determining the wear value is greater than the intermediate wear value threshold and below the end of life wear value threshold, transferring the workload associated with the first circuitry component to the second circuitry component with a wear value less than the intermediate wear value threshold.

18. The method of claim 13, wherein the first and second circuitry components are each (1) processor cores or (2) portions of a field programmable gate array (FPGA).

19. A non-transitory machine-readable medium including instructions that, when executed by a machine, cause the machine to perform operations comprising:
receiving wear indicator data corresponding to a first circuitry component, the wear indicator data including at least one terminal type data and multiple non-terminal types of data, the terminal type data, when above the wear indicator threshold, indicates the first circuitry component has no lifespan remaining, the non-terminal types of data indicate when multiple of the non-terminal types of data are greater than the wear threshold, that the first circuitry component has no lifespan remaining;
determining, based on the wear indicator data and the wear indicator threshold, that the first circuitry component has failed or is about to fail; and
migrating a workload from the first circuitry component to a second circuitry component.

20. The non-transitory machine-readable medium of claim 19, wherein the operations further comprise receiving, from an apparatus on which the second circuitry component resides, a communication indicating that the workload was successfully migrated to the second circuitry component or that the migration has failed.

21. The non-transitory machine-readable medium of claim 19, wherein the wear indicator indicates first circuitry component utilization, state, temperature, power utilization, voltage, memory bandwidth indicator, or cache utilization indicator.

22. The non-transitory machine-readable medium of claim 21, wherein the operations further comprise:
  determining a wear value based on two or more of the core utilization, core state, temperature, power utilization, voltage, memory bandwidth indicator, or cache utilization indicator;
  comparing the determined wear value to the wear value threshold; and
  determining the first circuitry component has failed or is about to fail in response to determining the wear value is greater than, or equal to, the wear value threshold.

23. The non-transitory machine-readable medium of claim 21, wherein the wear value threshold is one of a plurality of wear value thresholds on the memory, the wear value thresholds including an intermediate wear value threshold and an end of life wear value threshold, and wherein the operations further comprise:
  comparing the determined wear value to each of the wear value thresholds; and
  in response to determining the wear value is greater than the intermediate wear value threshold and below the end of life wear value threshold, transferring the workload associated with the first circuitry component to the second circuitry component with a wear value less than the intermediate wear value threshold.

24. The non-transitory machine-readable medium of claim 19, wherein the first and second circuitry components are each (1) processor cores or (2) portions of a field programmable gate array (FPGA).

25. A method to transfer a workload from a first component to a second component of a device, the method comprising:
  monitoring a wear indicator associated with the first component, the wear indicator data including at least one terminal type data and multiple non-terminal types of data, the terminal type data, when above the wear indicator threshold, indicates the first circuitry component has no lifespan remaining, the non-terminal types of data indicate, when multiple of the non-terminal types of data are greater than the wear threshold, that the first circuitry component has no lifespan remaining; and
  in response to an indication that the first component is stressed based on the wear indicator, transferring a workload of the first component to the second component.

26. The method of claim 25, wherein the first component is a first processor core and the second component is a second processor core.

27. The method of claim 25, wherein monitoring the wear indicator includes monitoring component utilization, state, overclocking, temperature, voltage, power utilization, and memory bandwidth indicator.

28. The method of claim 27, further comprising:
  determining a wear value based on two or more of the component utilization, state, overclocking, temperature, voltage, power utilization, and memory bandwidth indicator;
  comparing the determined wear value to a wear value threshold; and
  determining the first component is stressed in response to determining the wear value is greater than, or equal to, the wear value threshold.

29. The method of claim 28, wherein the wear value threshold is one of a plurality of wear value thresholds including an intermediate wear value threshold and an end of life wear value threshold, and the method further comprising:
  comparing the determined wear value to each of the wear value thresholds; and
  in response to determining the wear value is greater than the intermediate wear value threshold and below the end of life wear value threshold, transferring the workload associated with the first component to a third component with a wear value less than the intermediate wear value threshold.

30. The method of claim 25, wherein transferring the workload associated with the first component to the second component includes transferring a compute state and a link state to the second component.

31. The method of claim 30, wherein transferring the workload associated with the first component to the second component includes redirecting user data traffic, user control traffic, memory pages, and dirty memory pages to the second component.

32. At least one non-transitory machine-readable medium including instructions that, when executed by a machine; cause the machine to perform operations comprising:
  monitoring a wear indicator associated with a first processor core of a plurality of processor cores, the wear indicator data including at least one terminal type data and multiple non-terminal types of data, the terminal type data, when above the wear indicator threshold, indicates the first circuitry component has no lifespan remaining, the non-terminal types of data indicate, when multiple of the non-terminal types of data are greater than the wear threshold, that the first circuitry component has no lifespan remaining, and
  in response to an indication that the processor core is stressed, (1) transferring a workload associated with the first processor core to a second processor core or (2) reducing a rate of an oscillator that clocks the first processor core.

33. The at least one non-transitory machine-readable medium of claim 32, wherein the wear indicator indicates core utilization, core state, temperature, power utilization, voltage; memory bandwidth indicator, and cache utilization indicator.

34. The at least one non-transitory machine-readable medium of claim 33, wherein the operations further comprise:
  determining a wear value based on two or more of the core utilization, core state, temperature; power utilization, voltage, memory bandwidth indicator, and cache utilization indicator;
  comparing the determined wear value to a wear value threshold; and
  determining the processor core is stressed in response to determining the wear value is greater than, or equal to, the wear value threshold.

35. The at least one non-transitory machine-readable medium of claim 34, wherein the wear value threshold is one of a plurality of wear value thresholds including an intermediate wear value threshold and an end of life wear value threshold, and the operations further comprise:

comparing the determined wear value to each of the wear value thresholds; and in response to determining the wear value is greater than the intermediate wear value threshold and below the end of life wear value threshold, transferring the workload associated with the processor core to a spare processor core with a wear value less than the intermediate wear value threshold.

\* \* \* \* \*

UNITED STATES PATENT AND TRADEMARK OFFICE
CERTIFICATE OF CORRECTION

PATENT NO. : 10,936,449 B2  
APPLICATION NO. : 15/465247  
DATED : March 2, 2021  
INVENTOR(S) : Nguyen et al.

Page 1 of 1

It is certified that error appears in the above-identified patent and that said Letters Patent is hereby corrected as shown below:

In the Claims

In Column 19, Line 6, in Claim 5, delete "claim 2;" and insert --claim 2,-- therefor In Column 19, Line 23, in Claim 8, delete "voltage;" and insert --voltage,-- therefor In Column 19, Line 66, in Claim 13, delete "indicato" and insert --indicator-- therefor In Column 20, Line 4, in Claim 13, delete "indicate" and insert --indicate,-- therefor In Column 20, Line 15, in Claim 14, delete "resides;" and insert --resides,-- therefor In Column 20, Line 57, in Claim 19, delete "indicate" and insert --indicate,-- therefor In Column 22, Line 29, in Claim 32, delete "machine;" and insert --machine,-- therefor In Column 22, Line 49, in Claim 33, delete "voltage;" and insert --voltage,-- therefor In Column 22, Line 55, in Claim 34, delete "temperature;" and insert --temperature,-- therefor Signed and Sealed this  
Third Day of August, 2021

Drew Hirshfeld  
*Performing the Functions and Duties of the  
Under Secretary of Commerce for Intellectual Property and  
Director of the United States Patent and Trademark Office*